3,168,515
3-SUBSTITUTED-17α-THIENYL- AND -17α-THIA-
ZOLYL-17β-HYDROXY-ANDROSTENES
Taichiro Komeno, Osaka, Japan, assignor to
Shionogi & Co., Ltd., Osaka, Japan
No Drawing. Filed Apr. 23, 1963, Ser. No. 274,913
Claims priority, application Japan, Apr. 26, 1962,
37/17,086
5 Claims. (Cl. 260—239.5)

The present invention relates to androstane derivatives and production thereof. More particularly, it relates to the 17α-substituted 17β-hydroxyandrostane derivative represented by the formula:

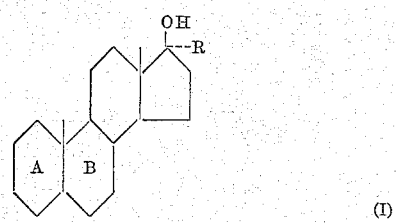

wherein R is a member selected from the group consisting of thienyl and thiazolyl and a protected 3-oxo-4-ene structure is present in the A- and B-rings. Examples of the protected 3-oxo-4-ene structure present in the A- and B-rings include a 3-ketalated oxo-5-ene structure such as 3,3-lower alkylenedioxy-5-ene (e.g. 3,3-ethylenedioxy-5-ene, 3,3-propylenedioxy-5-ene) and 3,3-di-(lower)alkoxy-5-ene (e.g. 3,3-dimethoxy-5-ene, 3,3-diethoxy-5-ene, 3,3-dipropoxy-5-ene), a 3-etherified hydroxy-3,5-diene structure such as 3-lower alkoxy-3,5-diene (e.g. 3-methoxy-3,5-diene, 3-ethoxy-3,5-diene, 3-propoxy-3,5-diene) and a 3-esterified hydroxy-3,5-diene structure such as 3-lower alkanoyloxy-3,5-diene (e.g. 3-acetyloxy-3,5-diene, 3-propionyloxy-3,5-diene, 3-butyryloxy-3,5-diene).

It is an object of the present invention to embody the said 17α-substituted 17β-hydroxyandrostane derivative of Formula I. Another object of the invention is to embody a process for preparing the 17α-substituted 17β-hydroxyandrostane derivative (I). A further object of the invention is to embody the 17α-substituted 17β-hydroxyandrostane derivative (I) which is useful as an intermediate in the production of physiologically active steroids. These and other objects will be apparent to those conversant with the art to which the present invention pertains from the subsequent description.

The objective 17α-substituted 17β-hydroxyandrostane derivative (I) is prepared from the corresponding 17-oxoandrostane derivative represented by the formula:

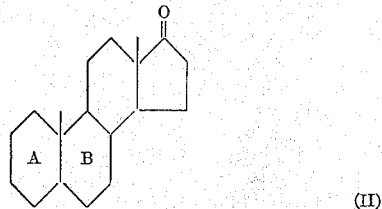

wherein a protected 3-oxo-4-ene structure is present in the A- and B-rings by subjecting the latter to the reaction with an organic metal compound containing the group corresponding to the above designated symbol "R," followed by hydrolysis.

The starting 17-oxoandrostane derivative of Formula II may be prepared by subjecting a well known compound, 3-oxo-17β-hydroxy-4-androstene (testosterone), to ketalation, followed by oxidation. For instance, 3-oxo-17β-hydroxy-4-androstene is ketalated in a conventional manner to give 3-ketalated oxo-17β-hydroxy-5-androstene, which is oxidized with chromic acid by a conventional procedure to 3-ketalated oxo-17-oxo-5-androstene. Alternatively, the starting 17-oxoandrostane derivative (II) may be also prepared by subjecting a well known compound, 3,17-dioxo-4-androstene (androtex), to enol-etherification or enolesterification. For instance, 3,17-dioxo-4-androstene is enoletherified or enolesterified according to a conventional method whereby 3-etherified or esterified hydroxy-17-oxo-3,5-androstadiene is prepared.

According to the process of the present invention, the 17-oxoandrostane derivative (II) is first treated with an organic metal compound containing the group corresponding to the above designated symbol "R" (e.g. thienyl lithium, thienyl sodium, thienyl magnesium halide, thiazolyl lithium, thiazolyl sodium, thiazolyl magnesium halide) in an inert organic solvent (e.g. ether, dioxane, tetrahydrofuran, benzene, toluene) at a temperature from 0 to 100° C., usually at room temperature (10 to 30° C.). The resulting addition product is then hydrolyzed in an acidic medium preferably by treating the same with an aqueous solution of an acidic salt (e.g. ammonium chloride, ammonium bromide, ammonium sulfate) at room temperature (10 to 30° C.).

The thus-produced 17α-substituted 17β-hydroxyandrostane derivative (I) is useful as an intermediate in the production of physiologically active steroids. Thus, the 17α-substituted 17β-hydroxyandrostane derivative (I) is treated according to a conventional procedure for the regeneration of a 3-oxo-4-ene structure, e.g. the treatment with an acid, to give generally the 3-oxo-17α-substituted 17β-hydroxy-4-androstene represented by the formula:

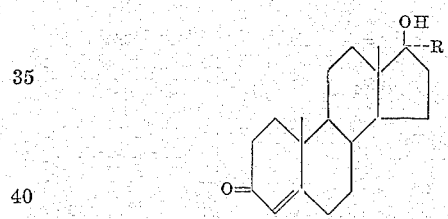

wherein R has the same significance as designated above, the latter being useful as a pituitary gonadotrophin inhibiting agent.

Practical and presently-preferred embodiments of the present invention are illustratively shown in the following examples. In the examples, abbreviations have each conventional significances: e.g. mg.=milligram(s); g.=gram(s); ml.=millilitre(s); ° C.=degrees centigrade; Anal. Calcd.=analysis calculated.

*Example 1*

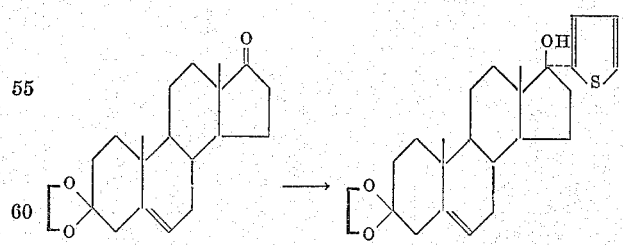

To a solution of butyl lithium prepared from metallic lithium (530) mg.) and butyl bromide (5.20 g.) in ether (80 ml.), there is added thiophene (3.18 g.), and the resultant mixture is allowed to stand at −10° C. for 1 hour. To the thus-produced solution of 2-thienyl lithium, there is added a solution of 3,3-ethylenedioxy-17-oxo-5-androstene (2.50 g.) in benzene (250 ml.), and the resultant solution is stirred for 5 hours at room temperature (10 to 30° C.) and then allowed to stand overnight. The reaction mixture is treated as in Example 1 and the obtained crude product crystallized from ether and recrystallized from a mixture of dichloromethane and acetone to give 3,3-ethylenedioxy-17α-(2-thienyl)-17β-hydroxy-5-androstene (2.30 g.) as crystals melting at 205 to 207° C./215° C. $[\alpha]_D^{25}$ −4.6±2° (in chloroform).

Analysis.—Calcd. for $C_{25}H_{34}O_3S$: C, 72.42; H, 8.27; S, 7.73. Found: C, 72.25; H, 8.40; S, 7.81.

*Example 2*

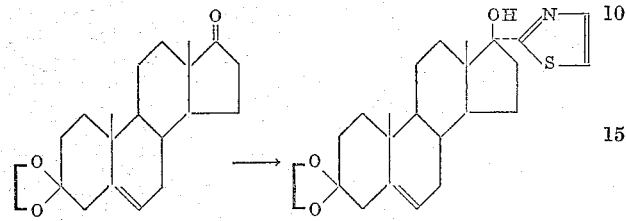

To a solution of phenyl lithium prepared from metallic lithium (367 mg.) and bromobenzene (4.12 g.) in ether (70 ml.), there is added a solution of 2-bromothiazole (4.30 g.) in benzene (40 ml.) at −27° C., and the resultant solution is stirred for 30 minutes. A solution 3,3-ethylenedioxy-17-oxo-5-androstene (2.01 g.) in benzene (200 ml.) is added thereto, stirred for 2 hours at −20 to −10° C. and then allowed to stand at room temperature (10 to 30° C.) overnight. The reaction mixture is combined with an aqueous solution of ammonium chloride and shaken with ether. The ether extract is washed with water, dried and evaporated to dryness. The residue is decolorized by treating with neutral alumina (25 g.), crystallized with ether and recrystallized from a mixture of dichloromethane and acetone to give 3,3-ethylenedioxy-17α-(2-thiazolyl)-17β-hydroxy-5-androstene (1.99 g.) as small leaflets melting at 216 to 218° C. (decomp.). $[\alpha]_D^{27}$ =25.9±2° (in chloroform).

Analysis.—Calcd. for $C_{24}H_{33}O_3NS$: C, 69.36; H, 8.00; N, 3.37; S, 7.72. Found: C, 69.47; H, 8.18; N, 3.50; S, 7.64.

The above prepared 3,3-ethylenedioxy-17α-(2-thiazolyl)-17β-hydroxy-5-androstene (2.19 g.) and p-toluenesulfonic acid hydrate (170 mg.) are dissolved in acetone (50 ml.), and the resultant solution is refluxed for 3 hours. The reaction mixture is made alkaline with an aqueous solution of sodium carbonate and shaken with chloroform. The chloroform extract is washed with water, dried over anhydrous sodium sulfate and evaporated to dryness. The residue is crystallized from ether and recrystallized from aqueous methanol to give 3-oxo-17α-(2-thiazolyl)-17β-hydroxy-4-androstene (1.66 g.) as flat needles melting at 195 to 197° C. $[\alpha]_D^{27}$ +100±2° (in chloroform).

Analysis.—Calcd. for $C_{22}H_{29}O_2NS$: C, 71.12; H, 7.87; N, 3.77; S, 8.63. Found: C, 71.26; H, 8.07; N, 3.88; S, 8.85.

What is claimed is:
1. A compound of the formula

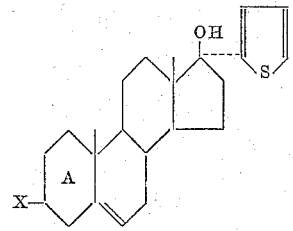

the substituent X being selected from the group consisting of 3,3-lower alkylenedioxy-, 3,3-di-(lower)alkoxy-, 3-lower alkoxy- and 3-lower alkanoyloxy-, the ring A including a double bond in the 3,4-position in the case of the 3-lower alkoxy- and 3-lower alkanoyloxy-substituents.

2. A compound of the formula

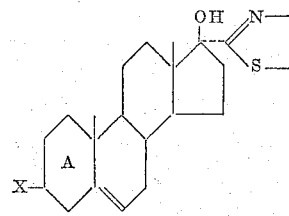

the substituent X being selected from the group consisting of 3,3-lower alkylenedioxy-, 3,3-di-(lower)alkoxy-, 3-lower alkoxy- and 3-lower alkanoyloxy-, the ring A including a double bond in the 3,4-position in the case of the 3-lower alkoxy- and 3-lower alkanoyloxy-substituents.

3. 3,3-ethylenedioxy-17α-(2-thienyl)-17β-hydroxy-5-androstene.

4. 3,3-ethylenedioxy-17α-(2-thiazolyl)-17β-hydroxy-5-androstene.

5. 3-oxo-17α-(2-thiazolyl)-17β-hydroxy-4-androstene.

References Cited in the file of this patent
UNITED STATES PATENTS
2,344,997   Miescher _____ Mar. 28, 1944

OTHER REFERENCES

Loewenthal: Tetrahedron, vol. 6, No. 4, pp. 269–303, 287–290 relied on June 1959.